United States Patent [19]
Hayward

[11] Patent Number: 5,082,224
[45] Date of Patent: Jan. 21, 1992

[54] AIRCRAFT PARTITION MOUNTING DEVICE

[76] Inventor: Joseph H. Hayward, 8416 Yolanda Ave., Northridge, Calif. 91324

[21] Appl. No.: 483,899

[22] Filed: Feb. 23, 1990

[51] Int. Cl.$^5$ ............................................. A47B 96/06
[52] U.S. Cl. ................................. 248/224.3; 160/135; 403/378
[58] Field of Search .......................... 248/200, 224.3; 403/362, 378; 52/825, 826, 239, 242; 160/135, 368.1; 211/194, 182

[56] References Cited

U.S. PATENT DOCUMENTS

| | | | |
|---|---|---|---|
| 3,323,657 | 6/1967 | Robbins | 211/182 X |
| 3,990,204 | 11/1976 | Haworth | 52/239 |
| 4,158,936 | 6/1979 | Fulton | 52/242 |
| 4,250,676 | 2/1981 | Presby | 160/135 X |
| 4,368,789 | 1/1983 | Orr | 403/378 X |
| 4,536,037 | 8/1985 | Rink | 403/378 X |
| 4,569,451 | 2/1986 | Parrott | 211/182 X |
| 4,573,513 | 3/1986 | Small | 211/194 X |
| 4,635,417 | 1/1987 | Larouche | 160/135 X |
| 4,821,788 | 4/1989 | Nelson | 160/135 |
| 4,841,699 | 6/1989 | Wilson | 52/221 |

FOREIGN PATENT DOCUMENTS 209546 11/1959 Austria ................................. 52/826

Primary Examiner—J. Franklin Foss
Attorney, Agent, or Firm—Rapkin, Gitlin, Moser & Schwartz

[57] ABSTRACT

An invention for facilitating the installation and removal of a partition or similar wall-like structure from the interior sections of an aircraft, including a support member, which is attached to any solid or structural section of the aircraft, and a partition fitting, which is secured along any edge of the partition or wall-like structure. The partition is then mountable within any area inside the aircraft by engaging the respective components in joined connection and securing them using any conventional means. The support member comprises a base plate and a section extending vertically from the base diminishing in thickness to form a shank member adaptable for releasable engagement with the partition fitting component of the device. The partition fitting includes a peripheral channel defined by parallel face opposed elements and is adaptable for connection along any edge of the partition or wall-like unit intended to be installed inside the aircraft.

5 Claims, 3 Drawing Sheets

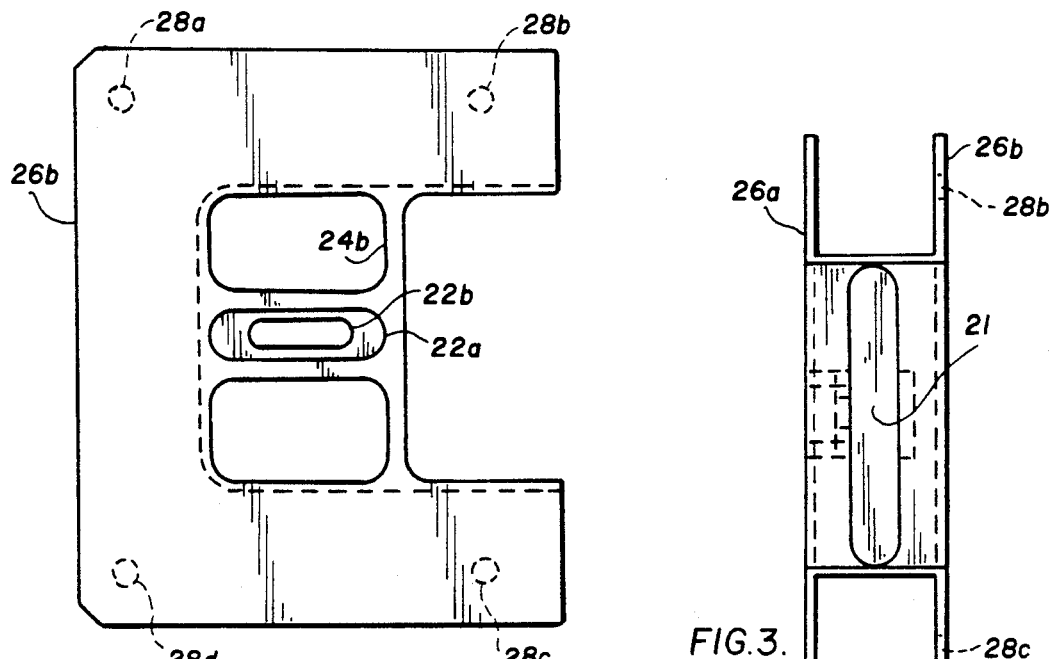
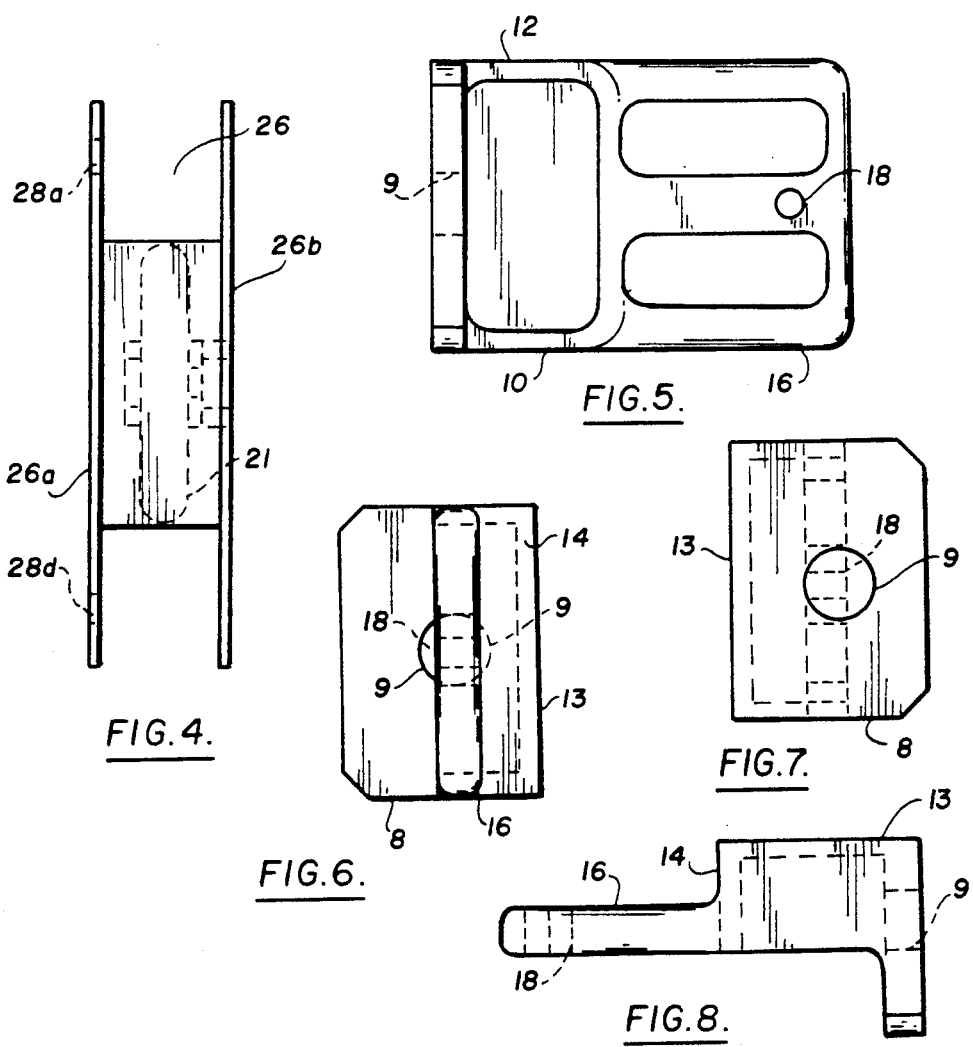

AIRCRAFT PARTITION MOUNTING DEVICE

FIELD OF INVENTION

The present invention relates generally to aircraft technology and more particularly to a device used in conjunction with walls and partitions to facilitate their installation and removal from the interior areas of an aircraft.

DESCRIPTION OF THE PRIOR ART

Devices and assemblies for attachment of partitions within an aircraft to divide areas into compartments are well-known in the art. An aircraft normally contains within the cabin and the cargo areas a plurality of partitions to divide one section from another. These partitions are used to segregate the cockpit from the main passenger cabin and also to segregate and isolate the galleys and bathrooms from the other sections of the aircraft. Major problems associated with prior art devices include, among others, the complexities of the assemblies themselves and an overabundance of parts resulting in fittings which are severely inefficient and commercially unfeasible. Assemblies of this type are usually one of the principal causes of the increasingly high cost of manufacturing and refurbishing aircraft. The cost of the material naturally increases in direct proportion to the increase in number of the parts involved. The labor costs usually increase in the same proportion. Such costs are principally realized when the interior partitions are installed or removed from the structural portions of the airframe during periods of normal maintenance and major overhauls of the aircraft. Of critical importance, however, is the direct impact that these assemblies can have on the overall weight of an aircraft, a significant factor relative to an aircraft's design and construction. An aircraft with excessive weight is not only less airworthy than one which is lighter, it also is much less fuel efficient.

The device of the present invention comprises an assembly enables the quick and efficient installation and removal of these partitions. The device comprises essentially two major components, one which is affixed to the partition itself and the other which is attached to a structural component of the airframe to serve ultimately as a support means for the partition fitting and an anchor to secure the partition to the aircraft. The two parts are brought together into a tight and fixed engagement through the use of a single connecting bolt or screw. The screw, when loosened, allows for an adjustment in the height or length of the assembly depending upon the spacial requirements of the area where the partition is being installed or removed. The withdrawal of the connecting bolt or screw allows for the quick and easy removal of the partition from anywhere inside the cabin or cargo areas.

Thus, an improvement offered by the device of the present invention is its simplicity of design, lightweight and ease and efficiency in which it performs its intended function.

The advantages and distinctions of the present invention over the prior art will become clearly evident in the following disclosure.

SUMMARY OF THE INVENTION

The present invention is a device comprised of two main components for facilitating the installation and removal of a partition or similar wall-like structure from the interior sections of an aircraft. The two components include a support member, which is attached to any solid or structural section of the aircraft, and a partition fitting, which is secured along any edge of the partition or wall-like structure. The partition is then mounted within any area inside the aircraft by simply engaging the respective components in joined connection and securing them using any conventional means.

The support member is of a uniform construction and comprises a base plate and a section extending vertically from the base diminishing in thickness to form a shank member adaptable for releasable engagement with the partition fitting component of the device. The partition fitting is also of a uniform construction and includes a peripheral channel defined by parallel face opposed flange elements. The partition fitting is adapted to be connected along any edge of the partition or wall-like unit intended to be installed inside the aircraft. To accommodate the specific dimensions of the peripheral channel of the partition fitting, a u-shaped section or cut away at one or more points along the edge of the partition is formed. The cut edges are then placed and secured firmly inside the peripheral channel between the two flanges and then affixed there by the use of any conventional means, such as a screw or nut and bolt.

Accordingly, an object of the present invention is to provide a device to facilitate the installation and removal of a partition or wall-like structure inside an aircraft.

Another object of the present invention is to provide a device that is convenient and easy to use for the aforesaid purpose.

Still another object of the present invention is to provide a device used for the aforesaid purpose that is simple in design, lightweight and inexpensive to manufacture.

Other objects and advantages of the present invention will become apparent in the following specifications when considered in light of the attached drawings wherein a preferred embodiment of the invention is illustrated.

A BRIEF DESCRIPTION OF THE DRAWINGS

FIG. 2 is a perspective view of the partition fitting component of the aircraft partition mounting device of the present invention.

FIG. 3 is a bottom perspective view of the partition fitting component of the aircraft partition mounting device of the present invention.

FIG. 4 is a top perspective view of the partition fitting component of the aircraft partition mounting device of the present invention.

FIG. 5 is a front perspective view of the base support component of the aircraft partition mounting device of the present invention.

FIG. 6 is a top perspective view of the base support component of the aircraft partition mounting device of the present invention.

FIG. 7 is a bottom perspective view of the base support component of the aircraft partition mounting device of the present invention.

FIG. 8 is a side perspective view of the base support component of the aircraft partition mounting device of the present invention.

DETAILED DESCRIPTION OF THE PREFERRED EMBODIMENT

Figure 1:
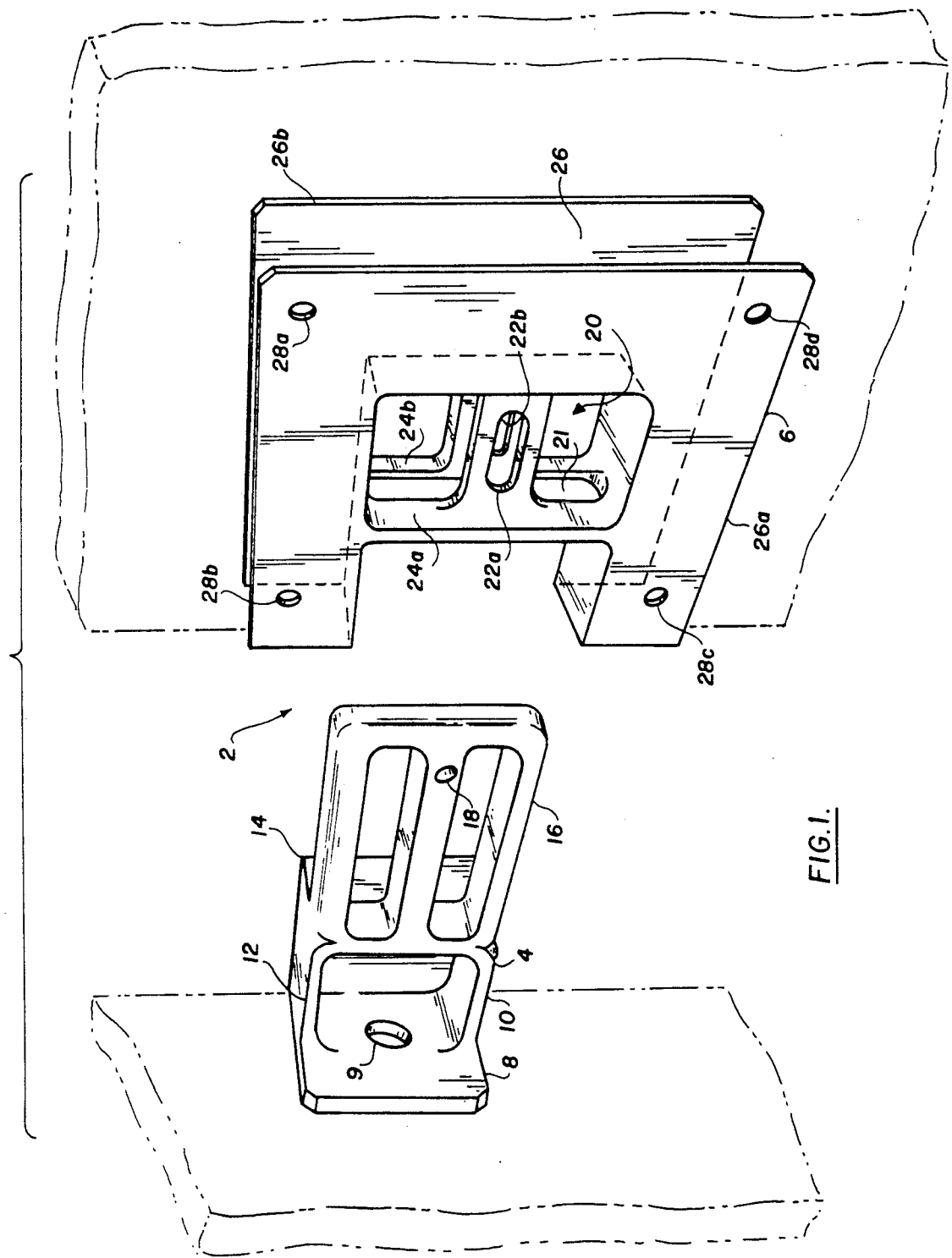
FIG. 1 is a perspective view of the aircraft partition mounting device of the present invention shown in its two component parts in conjunction with a section of a partition and mounting structure (shown in phantom).
Figure 10:
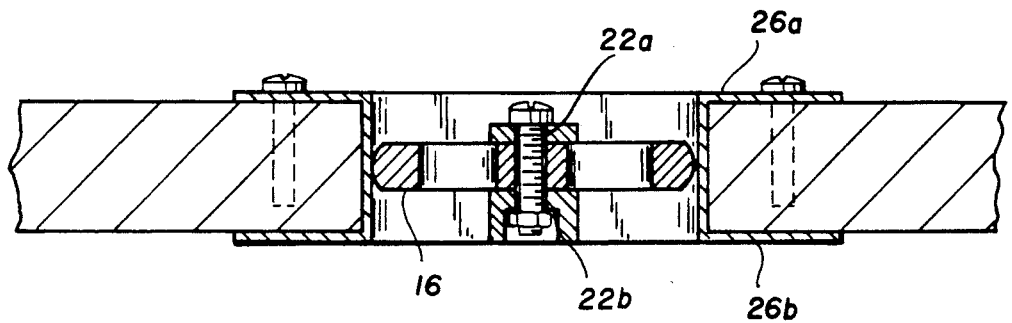
FIG. 10 is a top plan view of the attached components of the aircraft partition mounting device of the present invention.
Figure 9:
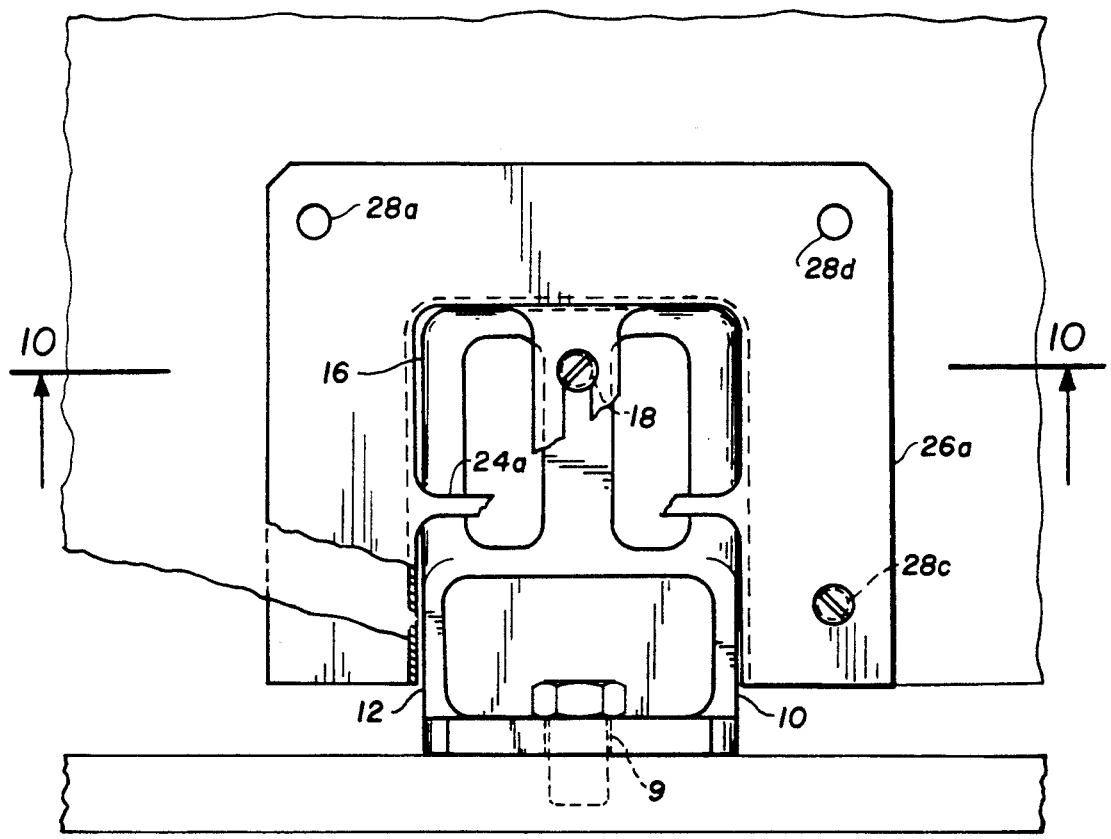
FIG. 9 is a front elevational view of the attached components of the aircraft partition mounting device of the present invention.

Referring more particularly to the drawings, FIG. 1 is a perspective view of the aircraft partition mounting device 2 of the present invention. Device 2 is comprised of support member 4 and partition fitting member 6 adapted for releasable engagement therewith. Support member 2, which is of a uniform construction and preferably fabricated of a light metal alloy, such as aluminum, includes a base plate 8 and an opening 9 therein to provide a means to secure support member 2 to a structural section of an aircraft. Extending vertically on opposite sides of base plate 8 are side members 10 and 12, which support a flat horizontal top member 14 and an elongated and relatively thinly constructed shank member 16 extending vertically therefrom. Situated between side members 10 and 12 and between baseplate 8 and top member 14, and formed integrally therewith, is rearwall member 13. Member 16 includes an opening 18 to engage a screw or similar means for adjusting the height or size of the assembly when the two components are in joined connection.

Fitting 6 includes an interior zone 20, which contains parallel vertically extending face opposed slots 22a, 22b. Within the central portion of zone 20, defined partially be slots 22a, 22b, is a horizontal slotted opening 21 adapted for releasable engagement with shank member 16. Integrally formed with and adjacent to slotted openings 22a, 22b are corresponding horizontal base members 24a, 24b and a peripheral channel 26 defined by circumferentially disposed parallel flange members 26a, 26b. Located near the perimeter of fitting 6 are holes 28a, 28b, 28c and 28d, which are adapted to receive screws or like means to enable secure mounting of fitting 6 to a partition or similar kind of wall structure situated inside the aircraft.

In a typical application of the present invention, support member 2 is attached to the floor, wall or ceiling of the cabin or cargo area of the aircraft, preferably where it can be anchored securely to a section of the airframe, and then firmly affixed to that location. Sections of the partition are then cut away in the approximate shape of a "u" to accommodate channel 26 defined by parallel flange members 26a, 26b. The partition is then inserted firmly into the space defined by flanges 26a, 26b, and screws, bolts or some similar means of attachment are inserted into openings 28a, 28b, 28c and 28d to engage the partition and secure it tightly to fitting 6. Support member 2 and fitting 6, or a plurality thereof, are then brought together in joined connection. A screw, bolt or similar item is then inserted into hole 18 extending through vertical slots 28a, 28b and adapted therein as a means to adjust the height or length of the assembly and fix the two in tight engagement when the adjustment is complete.

While the invention will be described in connection with a certain preferred embodiment, it is to be understood that it is not intended to limit the invention to that particular embodiment. Rather, it is intended to cover all alternatives, modification and equivalence as may be included within the spirit and scope of the invention as defined by the appended claims.

I claim:

1. A device for installing and securing a removable partition inside an aircraft, said device comprising:
   (a) a vertically disposed support member, including a generally flat base plate member, first and second side walls integrally formed with said base plate member and extending generally normal thereto along the respective side edges of said base plate member, a rear wall member integrally connected to said base plate member and said first and second side walls, a top member integrally formed with said rear wall and first and second side walls, and an elongated shank member integrally formed with and generally normal to said top member and containing a vertically extending opening therein, and;
   (b) a partition fitting generally wider than the width of said support member, including a slotted opening adapted for slidably receiving a substantially vertically disposed said elongated shank member in releasable connection therewith, a peripheral channel integrally formed about the top and both sides of said partition fitting for attachment to a removable partition and spaced elongated vertically extending slots that align with the opening in said shank member for receiving a means there through to secure said support member and said partition fitting when forming a joined connection.

2. The device of claim 1 wherein said baseplate member contains an opening for receiving a means to secure said support member to the floor, wall or ceiling of an aircraft.

3. The device of claim 1 wherein said partition fitting is adjustably mounted to said support member.

4. The device of claim 3 wherein said means to secure said support member to said partition fitting constitutes an adjustment screw.

5. The device of claim 1 wherein the shank member is adapted to be positioned off-center relative to said top member for providing substantial support to a partition fitting which has been affixed to a removable partition.

* * * * *